(12) United States Patent  
Ramachandran et al.

(10) Patent No.: US 8,371,814 B2  
(45) Date of Patent: Feb. 12, 2013

(54) TURBINE ENGINE COMPONENTS

(75) Inventors: Dhinagaran Ramachandran, Karnataka (IN); Balamurugan Srinivasan, Karnatatka (IN); Gopal Muthiah, Tamil Nadu (IN); Jyothishkumar Venkataramanan, Tamil Nadu (IN); Jong Liu, Scottsdale, AZ (US); Luis Tapia, Maricopa, AZ (US); Malak Fouad Malak, Tempe, AZ (US)

(73) Assignee: Honeywell International Inc., Morristown, NJ (US)

( * ) Notice: Subject to any disclaimer, the term of this patent is extended or adjusted under 35 U.S.C. 154(b) by 890 days.

(21) Appl. No.: 12/490,840

(22) Filed: Jun. 24, 2009

(65) Prior Publication Data

US 2010/0329846 A1    Dec. 30, 2010

(51) Int. Cl.  
*F01D 5/18* (2006.01)

(52) U.S. Cl. ...................................... 416/90 R; 415/115

(58) Field of Classification Search .................. 415/115, 415/116; 416/90 R, 97 R, 97 A  
See application file for complete search history.

(56) References Cited

U.S. PATENT DOCUMENTS

| | | | |
|---|---|---|---|
| 4,461,612 A | 7/1984 | Dodd | |
| 4,529,358 A | 7/1985 | Papell | |
| 4,653,983 A | 3/1987 | Vehr | |
| 4,664,597 A | 5/1987 | Auxier et al. | |
| 5,062,768 A | 11/1991 | Marriage | |
| 5,096,379 A | 3/1992 | Stroud et al. | |
| 5,261,223 A | 11/1993 | Foltz | |
| 5,281,084 A | 1/1994 | Noe et al. | |

(Continued)

FOREIGN PATENT DOCUMENTS

| | | |
|---|---|---|
| EP | 0924384 A2 | 6/1999 |
| EP | 0992653 A1 | 4/2000 |

(Continued)

OTHER PUBLICATIONS

Heidmann et al., A Novel Antivortex Turbine Film-Cooling Hole Concept, Journal of Turbomachinery, 2008 by ASME, Jul. 2008, vol. 130, pp. 031020-1-031020-9.

(Continued)

*Primary Examiner* — Dwayne J White  
(74) *Attorney, Agent, or Firm* — Ingrassia Fisher & Lorenz, P.C.

(57) ABSTRACT

A turbine engine component includes a wall, a main opening, and two clusters of two or more auxiliary openings. The wall includes cool and hot air sides. The main opening extends between the cool air side and the hot air side and has an inlet and an outlet. The inlet is formed on the cool air side, and the outlet is formed on the hot air side. The first cluster of two or more auxiliary openings extends from the main opening to the hot air side. The second cluster of two or more auxiliary openings extends from the main opening to the hot air side. The main opening may be cylindrical or conical with a converging passage extending from the cool air side to the hot air side. The converging main opening may enhance flow through the auxiliary openings especially at high blowing ratios.

17 Claims, 8 Drawing Sheets

U.S. PATENT DOCUMENTS

| | | | |
|---|---|---|---|
| 5,382,133 A | 1/1995 | Moore et al. | |
| 5,465,572 A | 11/1995 | Nicoll et al. | |
| 5,496,151 A * | 3/1996 | Coudray et al. | ............ 416/97 R |
| 5,511,937 A | 4/1996 | Papageorgiou | |
| 5,609,779 A | 3/1997 | Crow et al. | |
| 5,683,600 A | 11/1997 | Kelley et al. | |
| 5,747,769 A | 5/1998 | Rockstroh et al. | |
| 6,243,948 B1 | 6/2001 | Lee et al. | |
| 6,329,015 B1 | 12/2001 | Fehrenbach et al. | |
| 6,368,060 B1 | 4/2002 | Fehrenbach et al. | |
| 6,420,677 B1 | 7/2002 | Emer et al. | |
| 6,554,571 B1 | 4/2003 | Lee et al. | |
| 6,607,355 B2 | 8/2003 | Cunha et al. | |
| 6,616,406 B2 | 9/2003 | Liang | |
| 6,979,176 B2 | 12/2005 | Nakamata et al. | |
| 6,984,100 B2 | 1/2006 | Bunker et al. | |
| 7,131,814 B2 | 11/2006 | Nagler et al. | |
| 7,186,085 B2 | 3/2007 | Lee | |
| 7,186,091 B2 | 3/2007 | Lee et al. | |
| 7,246,992 B2 | 7/2007 | Lee | |
| 7,249,933 B2 | 7/2007 | Lee et al. | |
| 7,328,580 B2 | 2/2008 | Lee et al. | |
| 7,351,036 B2 | 4/2008 | Liang | |
| 7,374,401 B2 | 5/2008 | Lee | |
| 7,540,712 B1 | 6/2009 | Liang | |
| 7,997,867 B1 | 8/2011 | Shih et al. | |
| 7,997,868 B1 | 8/2011 | Liang | |
| 8,057,179 B1 | 11/2011 | Liang | |
| 8,057,180 B1 | 11/2011 | Liang | |
| 8,057,181 B1 | 11/2011 | Liang | |
| 2005/0023249 A1 | 2/2005 | Kildea | |
| 2006/0104807 A1 | 5/2006 | Lee | |
| 2006/0272335 A1 | 12/2006 | Schumacher et al. | |
| 2006/0277921 A1 | 12/2006 | Patel et al. | |
| 2007/0006588 A1 | 1/2007 | Patel et al. | |
| 2007/0128029 A1 | 6/2007 | Liang | |
| 2007/0234727 A1 | 10/2007 | Patel et al. | |
| 2008/0271457 A1 | 11/2008 | McMasters et al. | |
| 2009/0246011 A1 | 10/2009 | Itzel | |
| 2010/0040459 A1 | 2/2010 | Ohkita | |
| 2010/0124484 A1 | 5/2010 | Tibbott et al. | |
| 2010/0303635 A1 | 12/2010 | Townes et al. | |
| 2011/0097188 A1 | 4/2011 | Bunker | |
| 2011/0123312 A1 | 5/2011 | Venkataramanan et al. | |
| 2011/0217181 A1 | 9/2011 | Hada et al. | |
| 2011/0268584 A1 | 11/2011 | Mittendorf | |
| 2011/0311369 A1 | 12/2011 | Ramachandran et al. | |

FOREIGN PATENT DOCUMENTS

| | | |
|---|---|---|
| EP | 1609949 A1 | 12/2005 |
| EP | 1691033 A1 | 8/2006 |
| EP | 1698757 A2 | 9/2006 |
| EP | 1873353 A2 | 1/2008 |
| EP | 1876325 A2 | 1/2008 |
| EP | 1892375 A1 | 2/2008 |
| EP | 1942251 A2 | 7/2008 |
| EP | 1970628 A2 | 9/2008 |
| JP | 07332005 | 12/1995 |
| JP | 2001012204 | 1/2001 |
| JP | 2005090511 | 7/2005 |
| JP | 2006307842 | 11/2006 |

OTHER PUBLICATIONS

EP Search Report, EP10187079.8-2321 dated Apr. 2, 2011.

Kusterer et al., Double-Jet Film-Cooling for Highly Efficient Film-Cooling with Low Blowing Ratios, Proceedings of ASME Turbo Expo 2008: Power for Land, Sea and Air GT2008, Jun. 9-13, 2008, pp. 1-12, Berlin, Germany, GT2008-50073.

Wayne et al., High-Resolution Film Cooling Effectiveness Comparison of Axial and Compound Angle Holes on the Suction Side of a Turbine Vane, Transactions of the ASME, vol. 129, Apr. 2007, pp. 202-211.

Lu et al., Turbine Blade Showerhead Film Cooling: Influence of Hole Angle and Shaping, International Journal of Heat and Fluid Flow 28 (2007) pp. 922-931.

Kim et al., Influence of Shaped Injection Holes on Turbine Blade Leading Edge Film Cooling, International Journal of Heat and Mass Transfer 47 (2004) pp. 245-256.

Malak, F.M., et al.; Gas Turbine Engine Components With Film Cooling Holes Having Cylindrical to Multi-Lobe Configurations, U.S. Appl. No. 13/465,647, filed with the USPTO on May 7, 2012.

Loh, Teck Seng; Srigrarom, Sutthiphong; Investigative Study of Heat Transfer and Blades Cooling in the Gas Turbine, The Smithsonian/NASA Astrophysics Data System; Modern Physics Letters B, vol. 19, Issue 28-29, pp. 1611-1614 (2005).

Loh, Teck Seng; Srigrarom, Sutthiphong; Investigative Study of Heat Transfer and Blades Cooling in the Gas Turbine, Modern Physics Letters B, vol. 19, Issue 28-29, pp. 1611-1614 (2005).

Ronald S. Bunker; A Review of Shaped Hole Turbine Film-Cooling Technology; Journal of Heat Transfer, Apr. 2005, vol. 127, Issue 4, 441 (13 pages).

Shih, T. I.-P., NA, S.; Momentum-Preserving Shaped Holes for Film Cooling; ASME Conference Proceedings, Year 2007, ASME Turbo Expo 2007: Power for Land, Sea, and Air (GT2007), May 14-17, 2007, Montreal, Canada; vol. 4: Turbo Expo 2007, Parts A and B; Paper No. GT2007-27600, pp. 1377-1382.

Yiping Lu; Effect of Hole Configurations on Film Cooling From Cylindrical Inclined Holes for the Application to Gas Turbine Blades, A Dissertation, Submitted to the Graduate Faculty of the Louisiana State University and Agricultural and Mechanical College, Dec. 2007.

Colban, W., Thole, K.; Influence of Hole Shape on the Performance of a Turbine Vane Endwall Film-cooling Scheme, International Journal of Heat and Fluid Flow 28 (2007), pp. 341-356.

Gartshore, I., Salcudean, M., Hassan, I.: Film Cooling Injection Hole Geometry : Hole Shape Comparison for Compound Cooling Orientation, American Institute of Aeronautics and Astronautics, Reston, VA, 2001, vol. 39, No. 8, pp. 1493-1499.

Okita, Y., Nishiura, M.: Film Effectiveness Performance of an Arrowhead-Shaped Film Cooling Hole Geometry, ASME Conference Proceedings, ASME Turbo Expo 2006: Power for Land, Sea, and Air (GT2006), May 8-11, 2006 , Barcelona, Spain, vol. 3: Heat Transfer, Parts A and B, No. GT2006-90108, pp. 103-116.

Lu, Y., Allison, D., Ekkad, S. V.: Influence of Hole Angle and Shaping on Leading Edge Showerhead Film Cooling, ASME Turbo Expo 2006: Power for Land, Sea, and Air (GT2006), May 8-11, 2006 , Barcelona, Spain, vol. 3: Heat Transfer, Parts A and B, No. GT2006-90370 pp. 375-382.

* cited by examiner

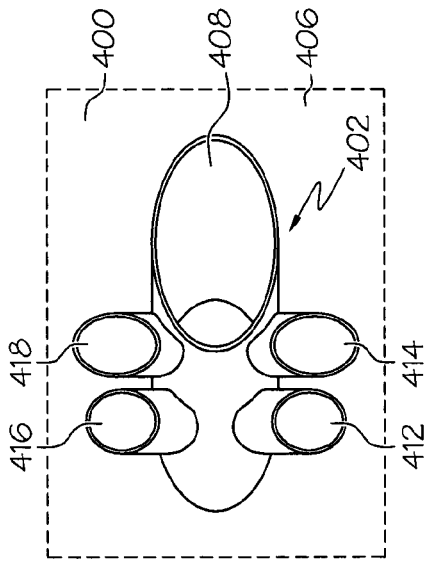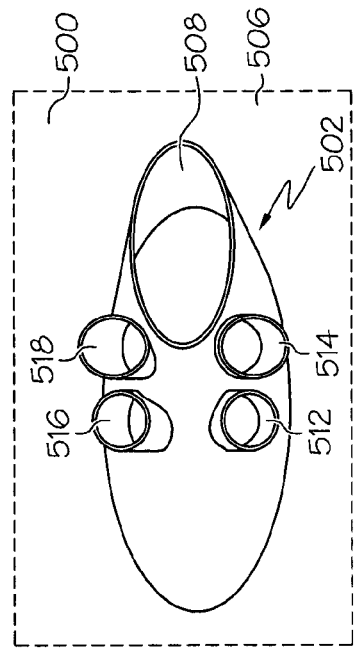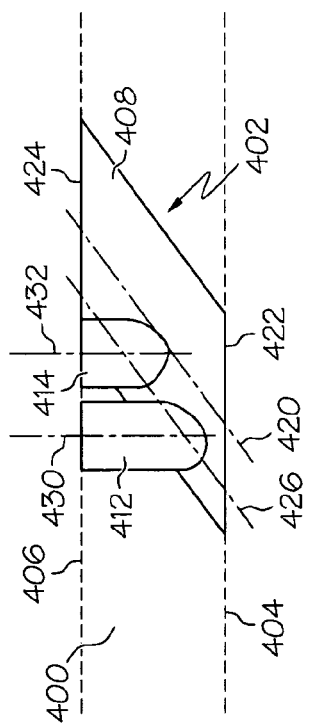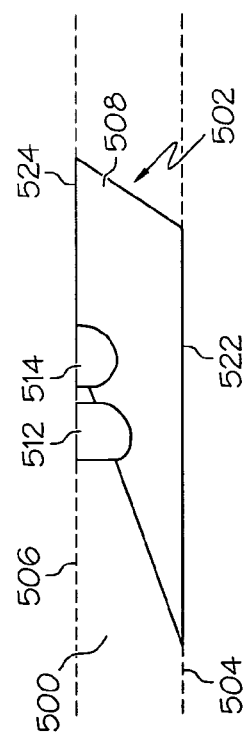

TURBINE ENGINE COMPONENTS

TECHNICAL FIELD

The inventive subject matter generally relates to gas turbine engine components, and more particularly relates to improved cooling features for use in gas turbine engine components.

BACKGROUND

Gas turbine engines may be used to power various types of vehicles and systems, such as air or land-based vehicles. In typical gas turbine engines, compressed air generated by axial and/or radial compressors is mixed with fuel and burned, and the expanding hot combustion gases are directed along a flowpath and through a turbine nozzle having stationary turbine vanes. The gas flow deflects off of the vanes and impinges upon turbine blades of a turbine rotor. A rotatable turbine disk or wheel, from which the turbine blades extend, spins at high speeds to produce power. Gas turbine engines used in aircraft use the gas turbine aft end to produce a forward thrust. Other gas turbine engines may use the power to turn a propeller or an electrical generator.

Modem aircraft jet engines have employed cooling systems to maintain the component temperatures within acceptable limits. In the case of the turbine vanes or blades, the blades are air cooled using, for example, bleed air from a compressor section of the engine. The air may enter near the blade root, and then flow through a cooling circuit formed in the turbine blade. The cooling circuit typically consists of a series of connected passages that form serpentine paths, which increase the cooling effectiveness by extending the length of the air flow path. The air may exit through cylindrically-shaped cooling holes formed through walls of the turbine blade. In typical combustors, which include inner and/or outer combustion liners that define a chamber for the hot combustion gases, a plurality of cylindrically-shaped effusion cooling holes supply a thin layer of cooling air that insulates the hot sides of the liners from extreme combustion temperatures. The liners also include major openings, much larger than the cooling holes, for the introduction of compressed air to feed the combustion process.

Although the aforementioned cooling systems operate adequately, they may be improved. In particular, as the demand increases for more efficient engines, engine operating temperatures increase as well. However, components including cylindrically-shaped cooling holes may experience undesired oxidation, coating issues or thermally induced stresses that may degrade the effectiveness, integrity or life of the components.

Accordingly, it is desirable to have improved cooling systems that may effectively cool components that are typically subjected to elevated operating temperatures, such as those above about 704° C. In addition, it is desirable for the system to be relatively simple and inexpensive to implement. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Turbine engine components are provided.

In an embodiment, by way of example only, a turbine engine component includes a wall, a main opening, and two clusters of two or more auxiliary openings. The wall includes a cool air side and a hot air side. The main opening extends between the cool air side and the hot air side and has an inlet and an outlet. The inlet is formed on the cool air side, and the outlet is formed on the hot air side. The first cluster of two or more auxiliary openings extends from the main opening to the hot air side. The second cluster of two or more auxiliary openings extends from the main opening to the hot air side.

In another embodiment, by way of example only, a turbine engine component includes a wall including a cool air side and a hot air side, a main opening extending between the cool air side and the hot air side, the main opening being conically-shaped and having an inlet and an outlet, the inlet formed on the cool air side, the outlet formed on the hot air side, and the inlet of the main opening having a flow area that is greater than a flow area of outlet of the main opening, a first cluster of two or more auxiliary openings extending from the main opening to the hot air side, and a second cluster of two or more auxiliary openings extending from the main opening to the hot air side.

BRIEF DESCRIPTION OF THE DRAWINGS

The inventive subject matter will hereinafter be described in conjunction with the following drawing figures, wherein like numerals denote like elements.

FIG. 4 is a side perspective view of a specially-designed cooling hole in a wall, according to an embodiment;

FIG. 5 is a top perspective view of the specially-designed cooling hole in FIG. 4, according to an embodiment;

FIG. 6 is a side perspective view of a specially-designed cooling hole in a wall, according to another embodiment;

FIG. 7 is a top perspective view of the specially-designed cooling hole in FIG. 6, according to another embodiment.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Figure 1:
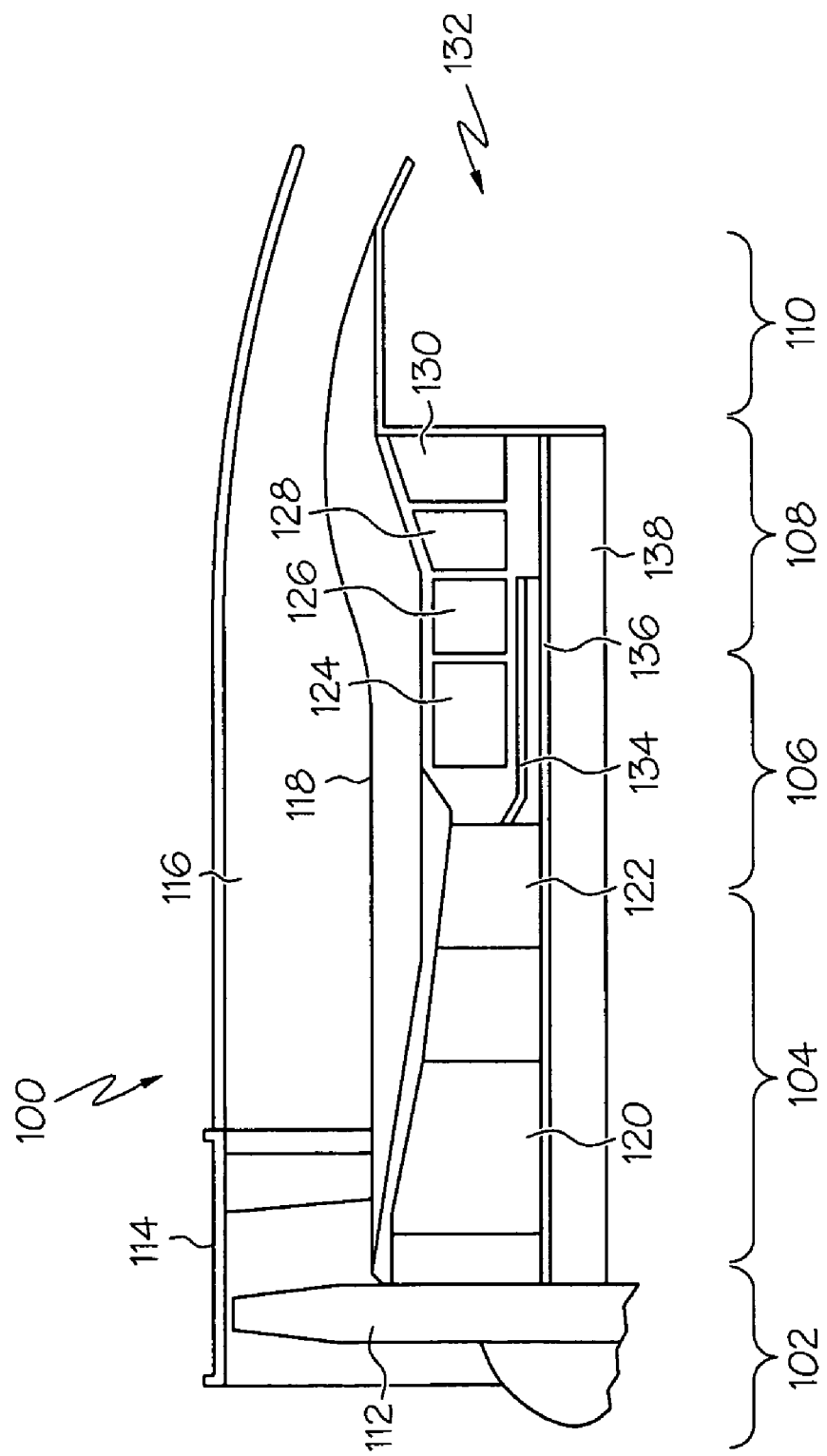
FIG. 1 is a simplified cross section side view of a turbine engine, according to an embodiment.

FIG. 1 is a simplified cross section side view of an exemplary multi-spool turbofan gas turbine jet engine 100. The jet engine 100 includes components having improved cooling capabilities, which are implemented by using specially-designed cooling holes. The specially-designed cooling holes may extend the useful lives of the components over those of conventional jet engine components. The specially-designed cooling holes may be employed in various sections of the jet engine 100 in which relatively cool air is used to cool a wall that may be exposed to relatively hot air.

In an embodiment, the engine 100 includes an intake section 102, a compressor section 104, a combustion section 106, a turbine section 108, and an exhaust section 110. The intake section 102 includes a fan 112, which is mounted in a fan case 114. The fan 112 draws air into the intake section 102 and accelerates it. A fraction of the accelerated air exhausted from the fan 112 is directed through a bypass section 116 disposed between the fan case 114 and an engine cowl 118, and provides a forward thrust. The remaining fraction of air exhausted from the fan 112 is directed into the compressor section 104.

The compressor section 104 includes two compressors, an intermediate pressure compressor 120 and a high pressure compressor 122. The intermediate pressure compressor 120 raises the pressure of the air directed into it from the fan 112, and directs the compressed air into the high pressure compressor 122. The high pressure compressor 122 compresses the air still further, and directs the high pressure air into the combustion section 106. In the combustion section 106, which includes an annular combustor 124, the high pressure air is mixed with fuel and combusted. The combusted air is then directed into the turbine section 108.

The turbine section 108 includes three turbines disposed in axial flow series, a high pressure turbine 126, an intermediate pressure turbine 128, and a low pressure turbine 130. The combusted air from the combustion section 106 expands through each turbine, causing it to rotate. The air is then exhausted through a propulsion nozzle 132 disposed in the exhaust section 110, providing additional forward thrust. As the turbines rotate, each drives equipment in the engine 100 via concentrically disposed shafts or spools. Specifically, the high pressure turbine 126 drives the high pressure compressor 122 via a high pressure spool 134, the intermediate pressure turbine 128 drives the intermediate pressure compressor 120 via an intermediate pressure spool 136, and the low pressure turbine 130 drives the fan 112 via a low pressure spool 138.

Figure 2:
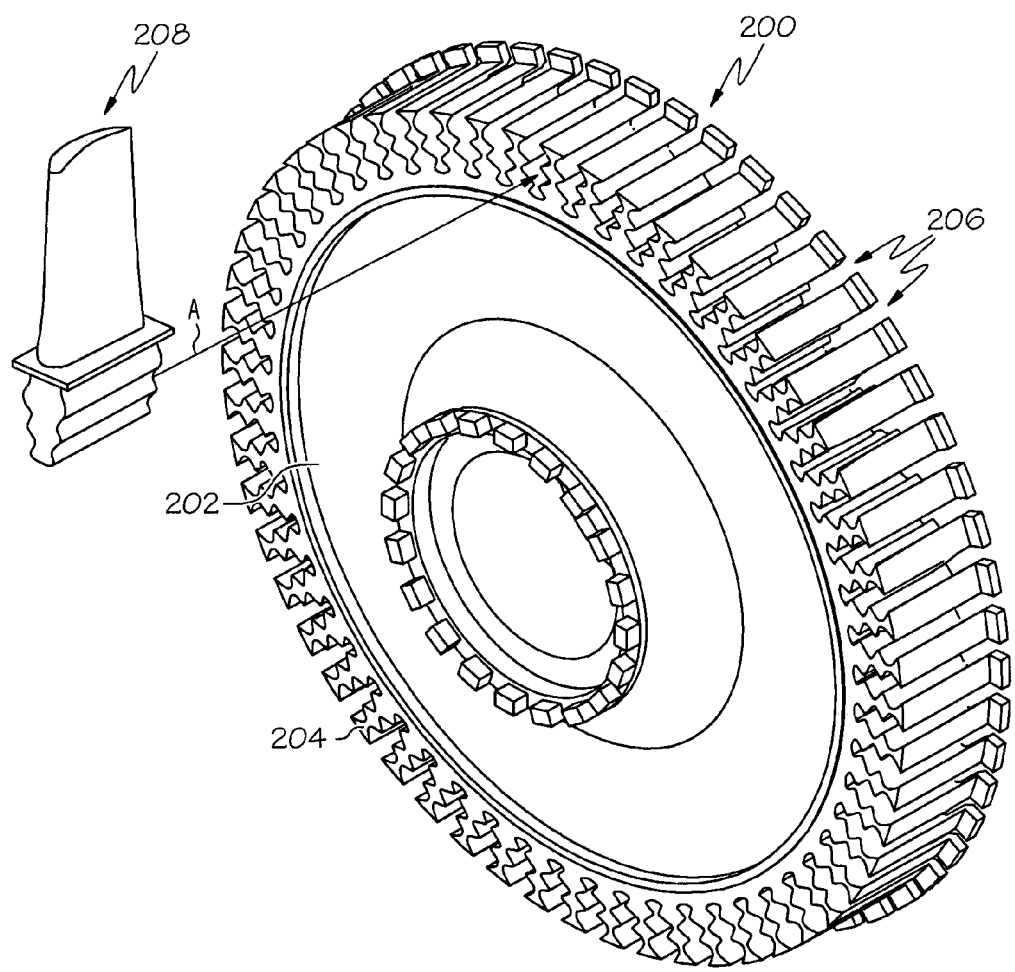
FIG. 2 is a perspective view of a turbine engine component, according to an embodiment.

As noted above, the improved components may be included in sections of the engine in which cool air is used to decrease a temperature of a component that is routinely exposed to high temperatures (such as temperatures that exceed 704° C. (1300° F.)). In one embodiment, the improved components may be included in the turbine section 108 of the engine 100. For example, one or more of the turbines (e.g., high pressure turbine 126, intermediate pressure turbine 128 or low pressure turbine 130), which may be exposed to high temperature air may be outfitted with the improvement. For illustrative purposes, FIG. 2 is a perspective view of a turbine engine component 200, according to an embodiment. In an embodiment, the turbine engine component 200 includes a disk 202 that has an outer rim 204 within which a plurality of blade attachment slots 206 is circumferentially formed. Although fifty-six blade attachment slots 206 are shown, more or fewer slots may be included in other embodiments. Each blade attachment slot 206 may be configured to attach a turbine blade 208 to the turbine disk, as indicated by arrow A.

Figure 3:
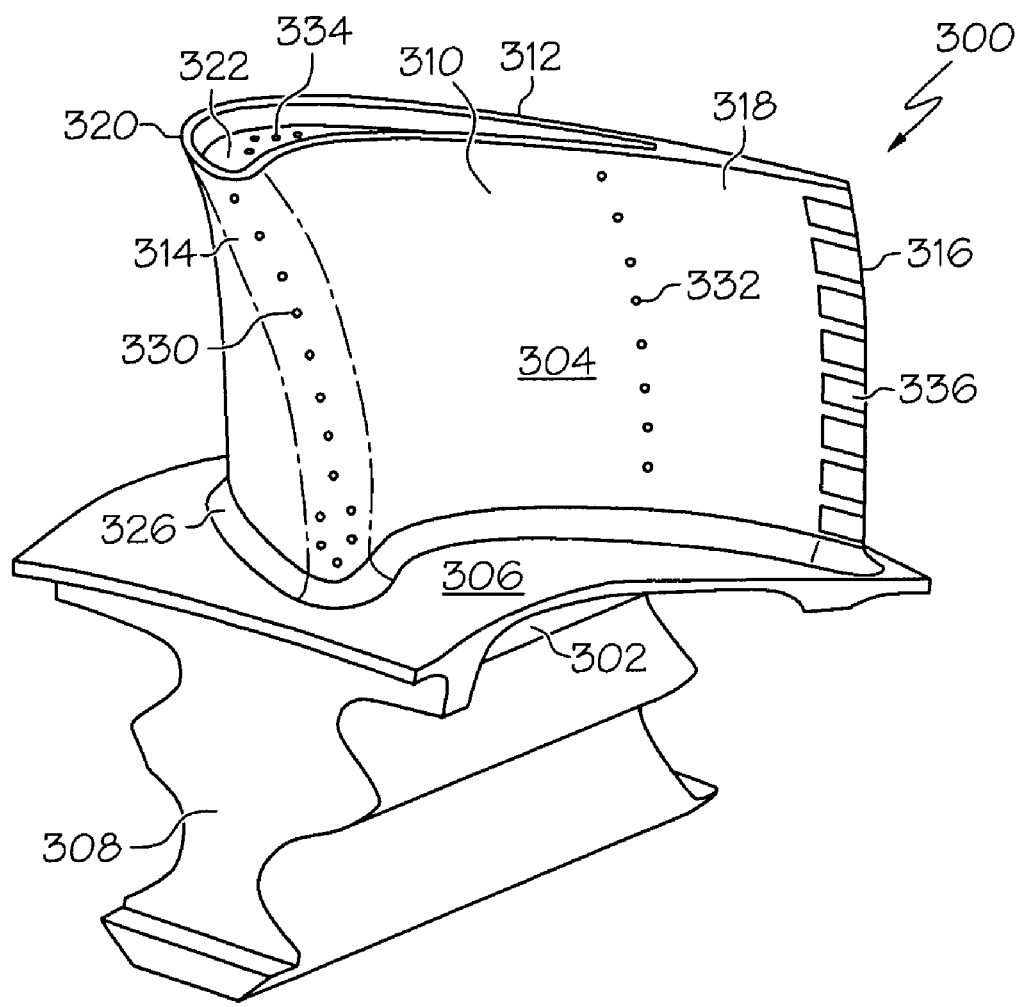
FIG. 3 is a perspective view of a turbine blade, according to an embodiment.

FIG. 3 is a perspective view of a turbine blade 300 that may be inserted into a blade attachment slot 206 of disk 202 (FIG. 2), according to an embodiment. In an embodiment, the turbine blade 300 includes a shank 302, an airfoil 304, a platform 306 and a root 308. The platform 306 is configured to radially contain turbine airflow from a non-illustrated air source. The root 308 is used to attach the blade 300 to the blade attachment slot 206 (FIG. 2) and has a shape that is suitable for attaching the blade 300 to the blade attachment slot 206. Thus, although the root 308 is shown to include a fir-tree shape, the root 308 may have a different shape in other embodiments.

The airfoil 304 has a concave outer wall 310, a convex outer wall 312, leading edge wall 314, trailing edge 316, and tip wall 322, each having outer surfaces that together define an airfoil shape. The airfoil shape also includes a pressure side 318 along the concave outer wall 310, a suction side 320 along the convex outer wall 312, and an airfoil platform fillet 326. To cool the concave outer wall or "pressure side wall" 310, the convex outer wall or "suction side wall" 312, the leading edge wall 314, and tip wall 322, an interior portion of the blade 300 includes an internal cooling circuit (not shown) that is configured to direct air from the root 308 to one or more rows of leading edge cooling holes 330, pressure side wall cooling holes 332, tip wall cooling holes 334 and/or trailing edge slots 336. To enhance cooling of the walls 310, 312, 314, 322, one or more of the leading edge cooling holes 330, pressure side wall cooling holes 332, and/or tip wall cooling holes 334 may be formed as specially-designed cooling holes, which have been found to reduce temperatures of surrounding material by about twice as efficiently as conventional cooling holes.

FIG. 4 is a, side perspective view and FIG. 5 is a top perspective view of a specially-designed cooling hole 402 in a wall 400, according to an embodiment. For purposes of showing the features of the cooling hole 402 more clearly, solid surfaces defining the hole 402 are shown, and the wall 400 is shown as being transparent. In any case, the wall 400 is configured to separate cold air from hot air and, thus, includes a cool air side 404 and a hot air side 406. As used herein, the term "cool air side" is defined as a surface of the wall 400 that is exposed to temperatures that are cooler than temperatures to which the "hot air side" may be exposed. Generally, the specially-designed cooling hole 402 is implemented into walls 400 having a thickness in a range of between about 0.1 cm and about 1.0 cm, in an embodiment. However, in other embodiments, the specially-designed cooling hole 402 may be used for walls 400 that are thicker or thinner than the aforementioned range.

The cooling hole 402 may be formed by various processes, including, but not limited to laser drilling, laser marking, laser caving, laser cutting, electro discharge machining or casting. In an embodiment, the cooling hole 402 may be defined by a main opening 408, a first cluster of auxiliary openings 412, 414, and a second cluster of auxiliary opening 416, 418. The main opening 408 extends between the cool air side 404 and the hot air side 406 and is formed such that a centerline (depicted by dotted line 420) through the main opening 408 is angled relative to the surface of the wall 400. For example, the centerline 420 and the surface of the hot air side 406 are not perpendicular to each other and form an angle that is in a range of about 30° to about 40° with respect to side 406.

In an embodiment, the main opening 408 has an inlet 422 and an outlet 424, where the inlet 422 is formed on the cool air side 404 of the wall 400, and the outlet 424 is formed on the hot air side 406 of the wall 400. According to an embodiment, the main opening 408 is generally cylindrically-shaped and has a substantially uniform flow area along the centerline 420 extending through the main opening 408. Thus, according to an embodiment, the inlet 422 and the outlet 424 have substantially equal flow areas. For example, the flow areas of the inlet 422 and the outlet 424 may be in a range of from about 0.001 cm² to about 0.80 cm². In other embodiments, the flow areas may be larger or smaller than the aforementioned range.

The first cluster of auxiliary openings 412, 414 and the second cluster of auxiliary openings 416, 418 extend from the main opening 408 to the hot air side 406 of the wall 400. A cluster may be defined herein as a group of two or more holes. Inclusion of the two clusters of auxiliary openings 412, 414, 416, 418 split the single jet of cool air flowing through the main opening 408 into multiple jets of cool air. Thus, the main opening 408 and the auxiliary openings 412, 414, 416, 418 each receive a relatively small mass flow, which reduces momentum of the cool air and allows the air to remain close to the surface of the hot air side 406 of the wall 400 in order to cool the wall 400.

To optimize the cooling effects, each cluster of auxiliary openings includes two or more auxiliary openings (e.g., auxiliary openings 412, 414, 416, 418). In an embodiment, two or more auxiliary openings may be arranged in a definable pattern. For example, in an embodiment, the two or more auxiliary openings may be arranged linearly. In accordance with an embodiment, a first auxiliary opening 412 of the first cluster may be located at a first location along an axis 426 that is substantially parallel with the centerline 420 through the main opening 408, while a second auxiliary opening 414 of the first cluster may be located at a second location along the axis 426. In other embodiments, the axis 426 may not be parallel with the centerline 420 and may angle away from the centerline 420. In accordance with another embodiment, the two or more auxiliary openings 412, 414 may be disposed in a circle, at corners of a rectangle, a triangle or another polygon. In accordance with still another embodiment, the two or more auxiliary openings 412, 414 may be disposed in a random pattern. In any case, the two or more auxiliary openings 412, 414 may be positioned closer to each other than to any of the auxiliary openings 416, 418 in the second cluster.

In an embodiment in which the second cluster is included, the two or more auxiliary openings 416, 418 may form a pattern that is substantially the same as or may mirror the two or more auxiliary openings 412, 414 of the first cluster. For example, the two auxiliary openings 416, 418 of the second cluster each may be located at positions on another axis (i.e., a different axis from axis 426) (not shown) that is substantially parallel with or angles away from the centerline 420. Although each cluster is shown as including two auxiliary openings 412, 414 or 416, 418, more auxiliary openings may be included in a cluster.

The centerline of each auxiliary opening 412, 414, 416, 418 may be angled relative to the surface of the hot air side 406 of the wall 400 in substantially the same manner as each other. With reference to FIG. 4, for example, centerlines (depicted by dotted lines 430, 432) of each auxiliary opening 412, 414 may extend substantially perpendicular to a surface of the hot air side 406 of the wall 400. In another embodiment, the centerlines 430, 432 of each auxiliary opening 412, 414 may be disposed at non-perpendicular angles relative to the surface of the hot air side 406 of the wall 400. According to an embodiment, the centerlines 430, 432 of each auxiliary opening 412, 414 may be angled in a range of about 60° to about 90° with respect to the surface of the hot air side 406. In another embodiment, the centerlines 430, 432 of each auxiliary opening 412, 414 may be disposed at angles that are more or less than the aforementioned range. One or more of the auxiliary openings 412, 414 may be angled similarly to each other relative to the hot air side 406 of the wall 400, in an embodiment. In another embodiment, the auxiliary openings 412, 414 may not be angled similarly to each other relative to the hot air side 406 of the wall 400. In any case, the auxiliary openings 412, 414, 416, 418 may have varying lengths measured along their centerlines that may fall within a range of about 0.1 cm to about 0.3 cm, in an embodiment. In other embodiments, the lengths of the auxiliary openings 412, 414, 416, 418 may be longer or shorter than the aforementioned range.

Additionally, the auxiliary openings 416, 418 of the second cluster may be formed substantially similar to those of the first cluster, in an embodiment. For example, the centerlines of the auxiliary openings 416, 418 of the second cluster may be disposed at angles that are substantially similar to the angles at which the centerlines of the auxiliary openings 412, 414 of the first cluster are disposed. In another example, the lengths of the auxiliary openings 416, 418 of the second cluster may be substantially equal to or in a range similar to that of the lengths of the auxiliary openings 412, 414 of the first cluster. In another embodiment, the auxiliary openings 416, 418 of the second cluster may not be formed substantially similar to those of the first cluster.

One or more of the auxiliary openings 412, 414, 416, 418 may have uniform cross-sectional flow areas (e.g., cross section taken perpendicular to axes 430, 432) that remain substantially constant from the main opening 408 to the hot air side 406, in an embodiment. In another embodiment, the cross-sectional flow area of one or more of the auxiliary openings 412, 414, 416, 418 may increase from the main opening 408 to the hot air side 412. In any case, the cross-sectional flow areas may have dimension in a range of about 0.0001 $cm^2$ to about 0.08 $cm^2$. However, in other embodiments, the cross-sectional flow areas may be larger or smaller than the aforementioned range in other embodiments. In any case, each auxiliary opening 412, 414, 416, 418 has a flow area that is about one tenth of the flow area of the inlet 422 of the main opening 408.

To further enhance cooling of the wall 400, the main opening 408 may not be cylindrically-shaped. FIG. 6 is a side perspective view and FIG. 7 is a top perspective view of a specially-designed cooling hole 502 in a wall 500, according to an embodiment. For purposes of showing the features of the cooling hole 502 more clearly, solid surfaces defining the hole 502 are shown, and the wall 500 is shown as being transparent. Here, the cooling hole 502 includes a main opening 508 and auxiliary openings 512, 514, 516, 518 that are substantially similar to main opening 408 and auxiliary openings 412, 414, 416, 418 in FIGS. 4 and 5, except main opening 508 is conically-shaped. Thus, the main opening 508 converges at a hot air side 506 of the wall 500 such that an inlet 522 of the main opening 508 has a flow area that is greater than a flow area of an outlet 524 of the main opening 508. For example, the flow area of the inlet 522 may be in a range of from about 0.006 $cm^2$ to about 5.0 $cm^2$, while the flow area of the outlet 524 may be in a range of from about 0.001 $cm^2$ to about 0.8 $cm^2$. In other embodiments, the flow areas may be larger or smaller than the aforementioned ranges. In an example, the outlets 524 may be about 20-80% smaller in cross section than the inlet 522. By including the converging main opening 508, increased amount of cool air flow may be provided to the auxiliary openings 512, 514, 516, 518. Additionally, the conically-shaped main opening 508 provides greater flexibility in formation of the auxiliary openings 512, 514, 516, 518.

Figure 8:
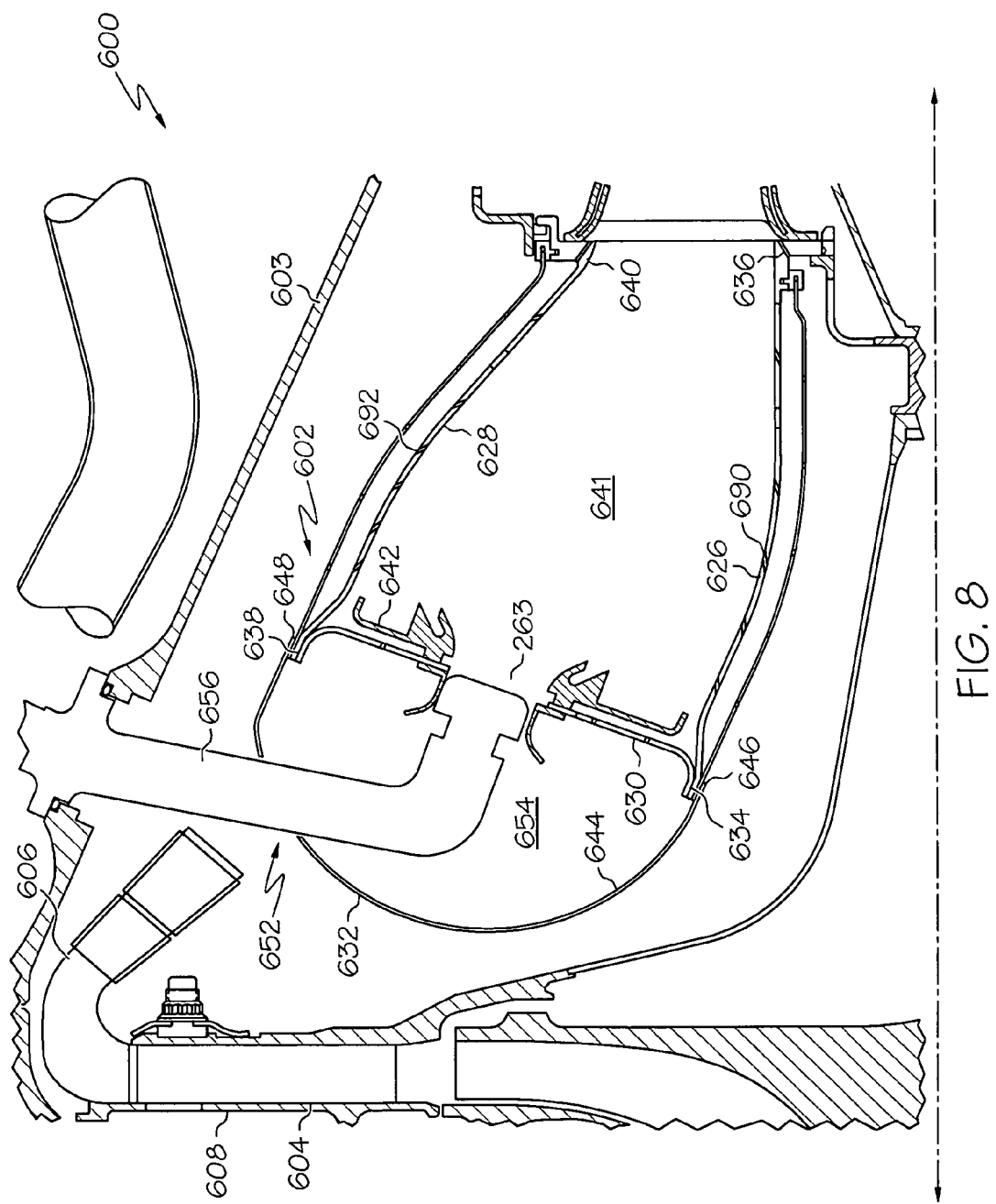
FIG. 8 is a cross-sectional view of a combustion section of a turbine engine, according to an embodiment.

The walls 400, 500 including the specially-designed cooling holes 402, 502 described above may be implemented into walls that make up other components as well. In another embodiment, the walls 400, 500 may be implemented as part of the combustion section 106 of the engine 100 of FIG. 1. FIG. 8 is a cross section view of a portion of a combustion section 600, according to an embodiment. The combustion section 600 includes an annular combustor 602, which receives a flow of air from a diffuser 604 and a deswirl assembly 606 of a compressor section 608.

In an embodiment, the annular combustor 602 is housed in a combustor housing 603 and includes an inner annular liner 626, an outer annular liner 628, a combustor dome 630, and a dome shroud assembly 632. The inner annular liner 626 and/or the outer annular liner 628 may be constructed in a similar fashion to walls 400, 500 described above. In an embodiment, the inner annular liner 626 includes an upstream end 634 and a downstream end 636. Similarly, the outer annular liner 628, which surrounds the inner annular liner 626, includes an upstream end 638 and a downstream end 640. The combustor dome 630 is coupled between the inner and outer annular liner upstream ends 634, 638, respectively, forming a combustion plenum 641 between the inner and outer annular liners 626,

628. In the depicted embodiment, a heat shield 642 is coupled to the combustor dome 630, though it will be appreciated that the heat shield 642 could be eliminated. It will additionally be appreciated that although the inner and outer annular liners 626, 628 in the depicted embodiment are of a double-walled construction, the liners 626, 628 could also be of a single-walled construction.

The dome shroud assembly 632 receives air that is discharged from the deswirl assembly 606 and minimizes extreme cross-flow velocities of the received air at the combustor dome 630 surface. Additionally, the dome shroud assembly 632 is configured to recover a portion of the dynamic head in the air flow to transform the head to static pressure. The dome shroud assembly 632 includes a curved annular plate 644 that has inner and outer annular edges 646, 648 and a plurality of openings (only one of which is shown, namely opening 652). The inner and outer annular edges 646, 648 are coupled to the inner and outer annular liner upstream ends 634, 638 to form a combustor subplenum 654. The combustor subplenum 654 provides a space within which air discharged from the deswirl assembly 606 is received and within which a plurality of fuel injector assemblies (only one of which is shown, namely assembly 656) is disposed.

During operation, the fuel injector assemblies 656 inject fuel into the combustion plenum 641, which is ignited to form hot, combustion gases. To cool the combustor 602, pluralities of cooling holes 690, 692 may be formed through one or both of the inner and outer annular liners 626, 628. For example, hundreds or thousands of cooling holes 690, 692 may be formed through the annular liners 626, 628. Each hole of the pluralities of cooling holes 690, 692 may be formed substantially identical to each other and may be angled in a substantially similar manner relative to a surface of the inner or outer annular liner 626, 628. In other embodiments, the holes of the plurality of cooling holes 690, 692 may be different. In any case, by forming some or all of the cooling holes 690, 692 similar to the specially designed cooling holes described above in conjunction with FIGS. 4-7, one or both of the annular liners 626, 628 may have enhanced cooling over conventionally-formed annular liners having conventionally-shaped cooling holes.

Figure 9:
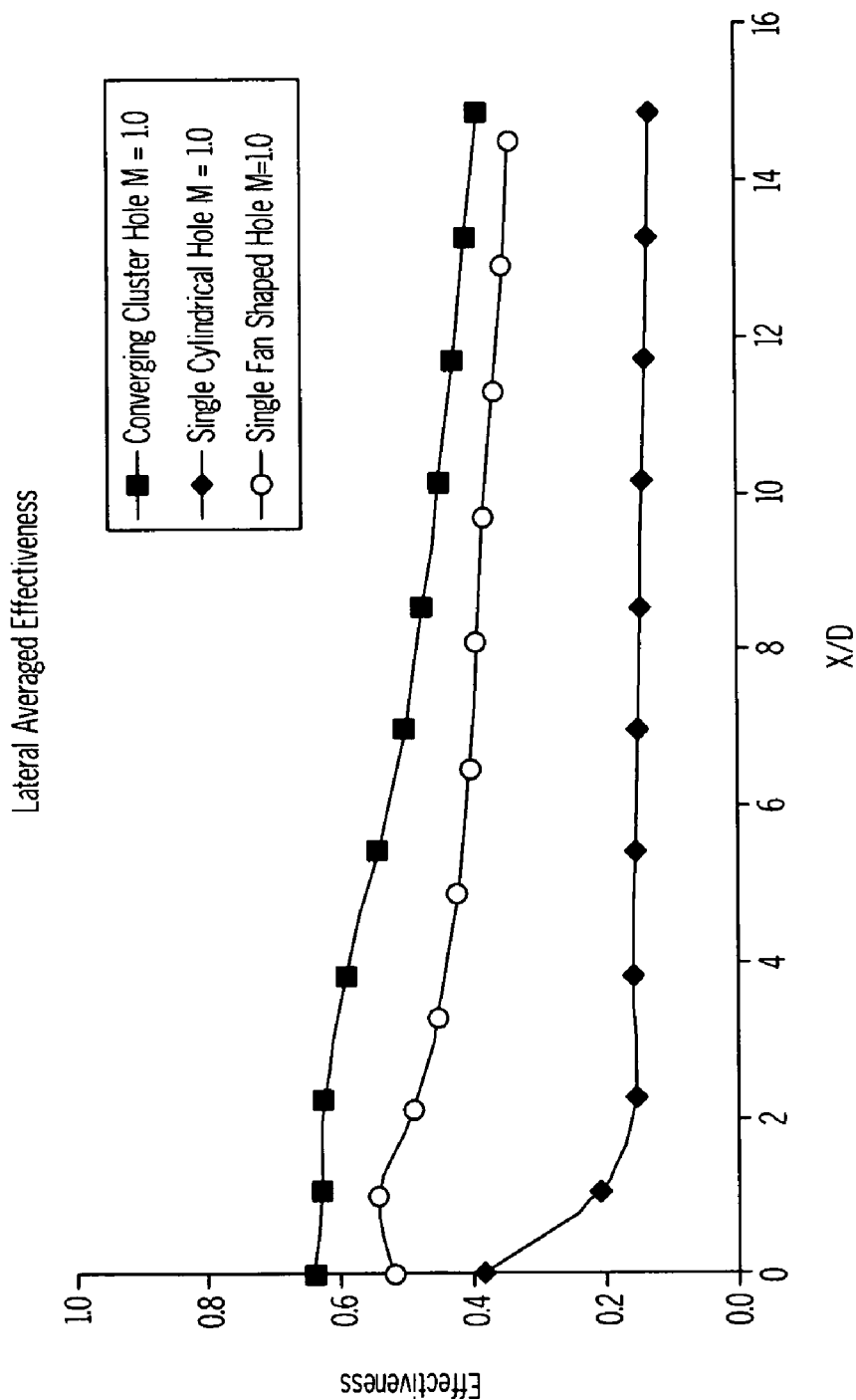
FIGS. 9-11 depict graphs comparing an effectiveness of a converging cluster hole, a cylindrical hole, and a single fan shaped hole, respectively.
Figure 10:
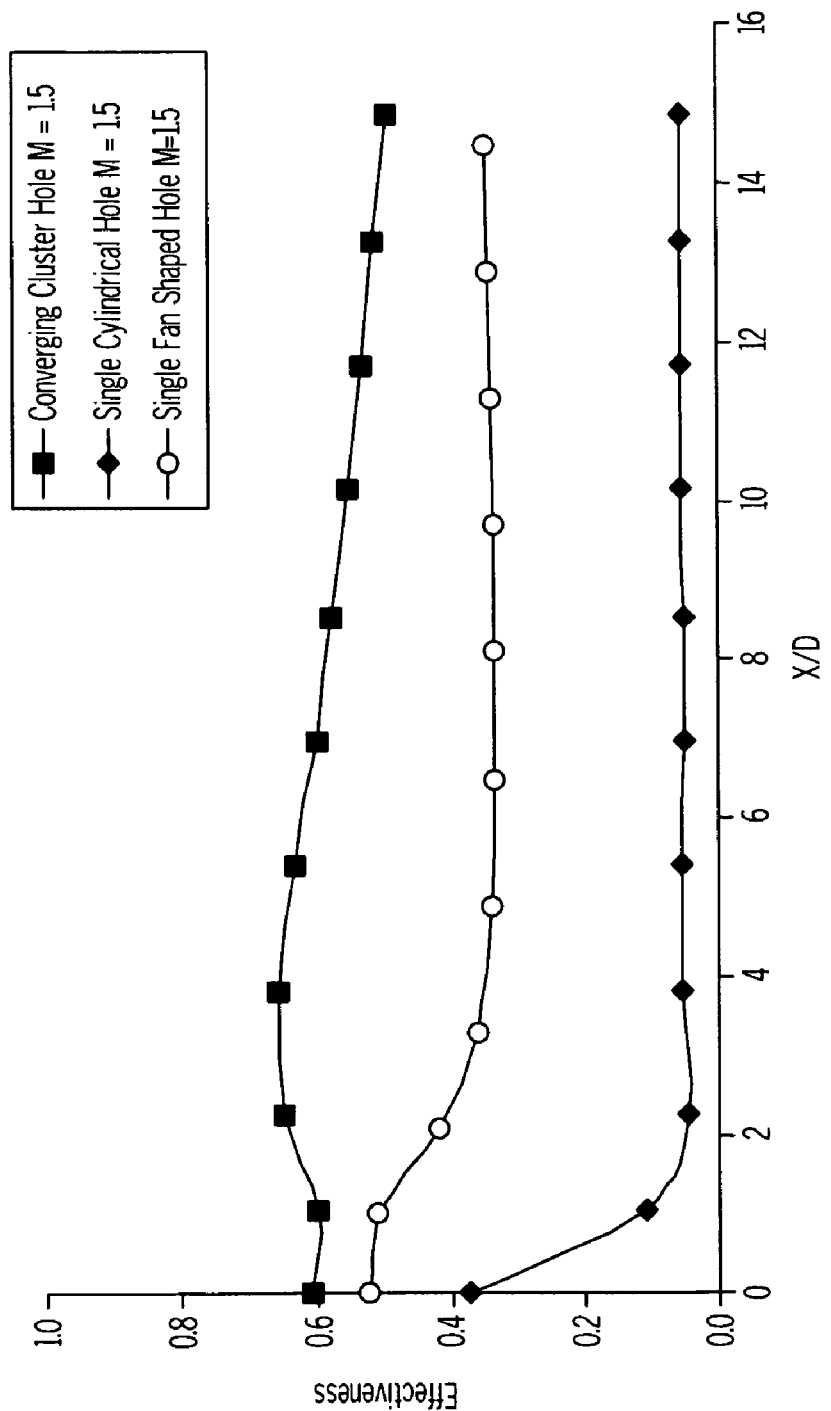
Figure 11:
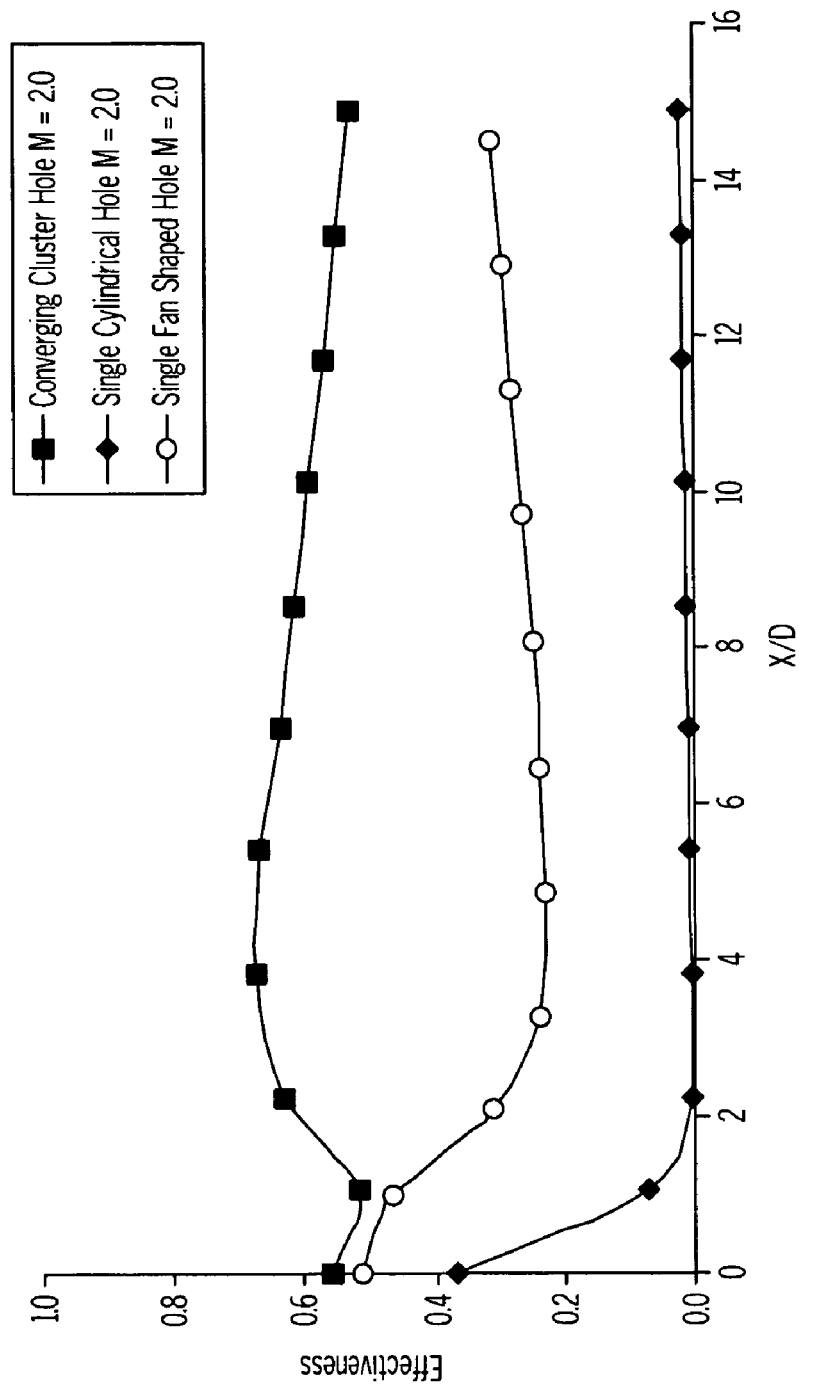

FIGS. 9-11 are graphs comparing an effectiveness of a converging cluster hole, a cylindrical hole, and a single fan shaped hole, according to an embodiment. In an embodiment, effectiveness is plotted against "X/D", where "X" is the normalized distance on the blade surface from the hole exit and "D" is the diameter of the hole. Effectiveness is a non-dimensional value that quantitatively represents how effectively a coolant flowing over a blade surface protects the blade surface from the high temperature mainstream flow. Effectiveness is calculated using the following formula:

$$\eta = (T_\infty - T_{aw})/(T_\infty - T_c) \quad (1)$$

Where,
$T_\infty$=Mainstream flow temperature (K)
$T_{aw}$=Adiabatic wall temperature (K)
$T_c$=Coolant temperature (K)

As shown in FIGS. 9-11, simulations were performed where each of the shaped film cooling holes was subjected to a blowing ratio "M". "M" was calculated using the following formula:

$$M = (\rho U)_j / (\rho U)_m \quad (2)$$

Where,
U=Velocity (m/s)
$\rho$=Density (kg/m$^3$)
$(\rho U)_j$=Mass flux of the Coolant flow
$(\rho U)_m$=Mass flux of the Mainstream flow Data was collected for each of the converging cluster hole, single cylindrical hole, and the single fan shaped hole, where M for each hole was set at 1.0 (FIG. 9), 1.5 (FIG. 10), and 2.0 (FIG. 11). For each experiment, $T_\infty$ and $T_c$, were set to constant values, and a line averaged values of $T_{aw}$ along different X/D ratios lines (0, 2, 4 . . . ) were extracted from computational fluid dynamics simulation results. In each experiment, the converging cluster hole had an ovular shaped main opening with an inlet diameter 2D, an exit diameter of D, and an angle in a range of about 30° to about 40° relative to a surface of the wall, and two clusters of two holes, where each cluster hole was substantially perpendicular to the surface of the wall, the first and second holes of the first cluster had opening diameters of about 0.5D and lateral angles relative to a centerline of the main opening in a range of about 15° to about 30°, and the first and second holes of the second cluster had opening diameters of about 0.5D and lateral angles relative to a centerline of the main opening in a range of about 15° to about 30°. The single cylindrical hole had diameter of D and was angled at an angle in a range of about 30° to about 40° relative to the surface of the wall, and the single fan shaped hole had a main section formed at an angle in a range of about 30° to about 40° relative to the surface of the wall with a diameter of D and an angled section with a forward diffuse angle in a range of about 10° to about 14° relative to the surface of the wall and a lateral angle in a range of about 10° to about 14° relative to a centerline of the main section. As indicated in each of FIGS. 9-11, the converging cluster hole provided a higher effectiveness value (i.e., a higher cooling performance) than both the single fan shaped and single cylindrical holes.

Improved cooling systems have now been provided that may effectively cool components that are typically subjected to elevated operating temperatures, such as those above about 704° C. The improved cooling systems, which include the specially-designed cooling holes described above, are simple and inexpensive to implement. The improvement in laterally averaged cooling effectiveness for converging cluster holes over other standard shaped holes is shown in FIG. 9-11 for varying blowing ratios (ratio of cool air to hot air mass flux). It must be noted that these converging cluster holes are not optimized for cooling effectiveness and are exemplary only.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A turbine engine component, comprising:
   a wall comprising a portion of a combustor liner and including a cool air side and a hot air side;
   a main opening extending between the cool air side and the hot air side, the main opening having an inlet and an outlet, the inlet formed on the cool air side, and the outlet formed on the hot air side;
   a first cluster of two or more auxiliary openings extending from the main opening to the hot air side; and
   a second cluster of two or more auxiliary openings extending from the main opening to the hot air side, wherein:

the first cluster of two or more auxiliary openings includes a first auxiliary opening and a second auxiliary opening, the first auxiliary opening of the first cluster of two or more auxiliary openings disposed at a first location on a first axis that is substantially parallel to a centerline through the main opening, and the second auxiliary opening the first cluster of two or more auxiliary openings disposed at a second location on the first axis.

2. The turbine engine component of claim 1, wherein the main opening is conically-shaped and the inlet of the main opening has a flow area that is greater than a flow area of the outlet of the main opening.

3. The turbine engine component of claim 1, wherein the main opening is cylindrically-shaped.

4. The turbine engine component of claim 1, wherein a centerline through the main opening extends at an angle that is not perpendicular relative to a surface of the hot air side.

5. The turbine engine component of claim 1, wherein:

the second cluster of two or more auxiliary openings includes a third auxiliary opening and a fourth auxiliary opening, the third auxiliary opening disposed at a first location on a second axis, the second axis being substantially parallel to a centerline through the main opening, and the fourth auxiliary opening disposed at a second location on the second axis.

6. The turbine engine component of claim 1, wherein:

each auxiliary opening of the first cluster of two or more auxiliary openings and each auxiliary opening of the second cluster of two or more auxiliary openings has a flow area that is about one tenth of a flow area at the inlet of the main opening.

7. The turbine engine component of claim 1, wherein a flow area at the inlet of the main opening is in a range of about 0.001 cm$^2$ to about 0.8 cm$^2$ and a flow area of each auxiliary opening of the first cluster of two or more auxiliary openings and of each auxiliary opening of the second cluster of two or more auxiliary openings is in a range of about 0.0001 cm$^2$ to about 0.08 cm$^2$.

8. The turbine engine component of claim 1, wherein the wall comprises a portion of a turbine blade.

9. The turbine engine component of claim 1, wherein the wall comprises a portion of a combustor liner.

10. A turbine engine component, comprising:

a wall including a cool air side and a hot air side;

a main opening extending between the cool air side and the hot air side, the main opening being conically-shaped and having an inlet and an outlet, the inlet formed on the cool air side, the outlet formed on the hot air side, and the inlet of the main opening having a flow area that is greater than a flow area of outlet of the main opening;

a first cluster of two or more auxiliary openings extending from the main opening to the hot air side; and a second cluster of two or more auxiliary openings extending from the main opening to the hot air side, wherein:

the first cluster of two or more auxiliary openings includes a first auxiliary opening and a second auxiliary opening, the first auxiliary opening of the first cluster of two or more auxiliary openings disposed at a first location on a first axis that is substantially parallel to a centerline through the main opening, and the second auxiliary opening the first cluster of two or more auxiliary openings disposed at a second location on the first axis.

11. The turbine engine component of claim 10, wherein a centerline through the main opening extends at an angle that is not perpendicular relative to a surface of the hot air side.

12. The turbine engine component of claim 10, wherein:

the second cluster of two or more auxiliary openings includes a third auxiliary opening and a fourth auxiliary opening, the third auxiliary opening disposed at a first location on a second axis, the second axis being substantially parallel to a centerline through the main opening, and the fourth auxiliary opening disposed at a second location along the second axis.

13. The turbine engine component of claim 10, wherein:

each auxiliary opening of the first cluster of two or more auxiliary openings and each auxiliary opening of the second cluster of two or more auxiliary openings has a flow area that is about one tenth of the flow area at the inlet of the main opening.

14. The turbine engine component of claim 10, wherein a flow area at the inlet of the main opening is in a range of about 0.006 cm$^2$ to about 5.0 cm$^2$ and a flow area of each auxiliary opening of the first cluster of two or more auxiliary openings and of each auxiliary opening of the second cluster of two or more auxiliary openings is in a range of about 0.0006 cm$^2$ to about 0.5 cm$^2$.

15. The turbine engine component of claim 10, wherein the wall comprises a portion of a turbine blade.

16. The turbine engine component of claim 10, wherein the wall comprises a portion of a combustor liner.

17. A turbine engine component, comprising:

a wall comprising a portion of a combustor liner and including a cool air side and a hot air side;

a main opening extending between the cool air side and the hot air side, the main opening having an inlet and an outlet, the inlet formed on the cool air side, and the outlet formed on the hot air side;

a first cluster of two or more auxiliary openings extending from the main opening to the hot air side; and a second cluster of two or more auxiliary openings extending from the main opening to the hot air side.

* * * * *